July 26, 1932.  W. A. CHRYST  1,869,092
SHOCK ABSORBER
Filed July 8, 1931
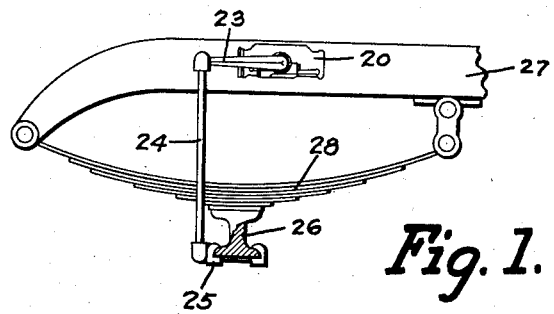
Fig. 1.
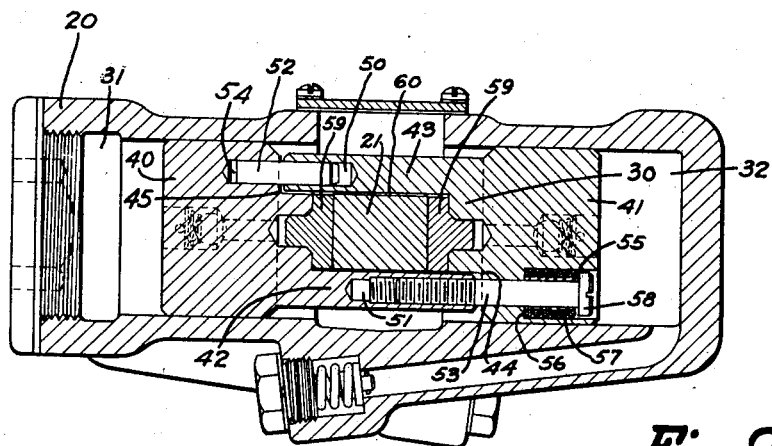
Fig. 2.
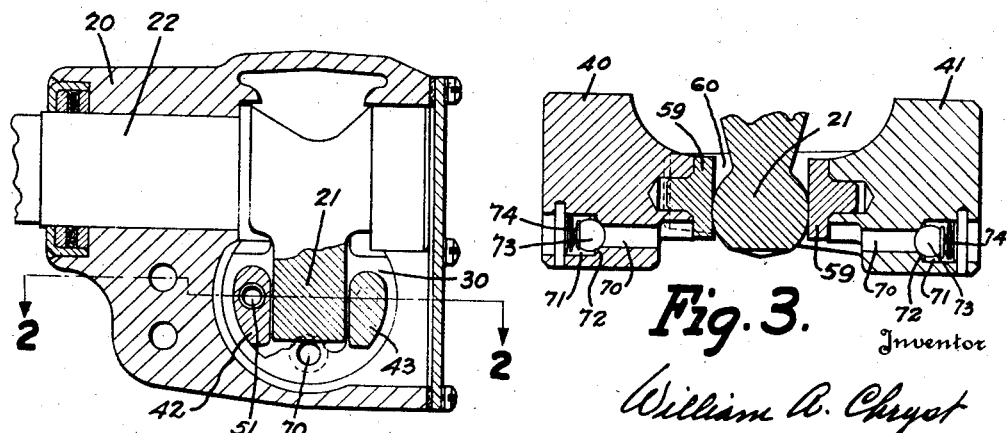
Fig. 3.
Fig. 4.
Inventor
William A. Chryst
By Jewens, Hardman & Fehr
Attorneys Patented July 26, 1932

1,869,092

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed July 8, 1931. Serial No. 549,424.

This invention relates to improvements in pistons, and particularly pistons adapted to be used in hydraulic shock absorbers.

It is among the objects of the present invention to provide a sturdy, double-headed, two-piece piston.

A further object of the present invention is to provide a double-headed, two-piece piston with means for securing the two pieces together so that the piston head portions are maintained in properly spaced relation and coaxially aligned, said means for holding said pistons together being adapted to yield and permit separation of the piston heads in case one of said piston heads should stick in the cylinder in which said piston is reciprocating.

Further objects and advantages of the present invention will be apparent from the following description, reference being had to the accompanying drawing wherein a preferred embodiment of one form of the present invention is clearly shown.

In the drawing:

Fig. 1 is a fragmentary side view of a vehicle chassis, with a shock absorber equipped with one of the pistons being shown applied thereto.

Fig. 2 is a longitudinal sectional view through the cylinder of a shock absorber in which there is provided a piston according to the present invention.

Fig. 3 is a longitudinal sectional view of the piston taken at right angles to the sectional view of Fig. 2.

Fig. 4 is a transverse sectional view of a shock absorber equipped with the piston of the present invention.

Pistons in shock absorbers are reciprocated to displace fluid within the casing of the shock absorber, said fluid displacement being restricted so as to resist the movement of the piston which is connected with one of the relatively movable members.

Shock absorbers comprise a casing 20 providing a cylinder in which the piston reciprocates. The piston is operated by an oscillatable lever 21 carried by a rocker shaft 22 which is journalled in the shock absorber casing. The rocker shaft in turn has an operating arm 23 secured thereto, the free end of which is swivelly secured to a link 24, one end of which is attached to a bracket 25 anchored to the axle 26 of the vehicle in any suitable manner. The casing 20 of the shock absorber is attached to the frame 27 of the vehicle in any suitable manner. This frame 27 is supported upon the axle 26 by springs 28.

From the aforegoing it may be seen that as the axle 26 moves toward or away from the frame 27 of the vehicle, the link connection 24 with the operating lever 23 of the shock absorber moves the piston 30 back and forth in the shock absorber cylinder, thus exerting pressure upon the fluid in the compression chambers 31 and 32 in the shock absorber casing.

The present invention provides a piston made up of two separate and distinct parts. Each part comprises a piston head portion, one being designated by the numeral 40, the other by the numeral 41. Each piston head portion has a lug or web portion extending therefrom substantially parallel to the axis of the piston and off center therefrom. The lug of the piston head portion 40 is designated by the numeral 42, while the lug of the piston head portion 41 is designated by the numeral 43. The end of the lug 42 is seated in a cut-away 44 in the inner end of the piston head portion 41. Similarly, the end of the lug 43 of the piston head portion 41 is seated in a cut-away 45 in the piston head portion 40.

The lug 43 has a recess 50 aligning with a similar recess 54 in the head portion 40. A pilot pin 52 slidably fits into these aligned recesses 50 and 54. On the opposite side of the axis of the pistons, the lug 42 of the piston head 40 has a recess 51 interiorly threaded to receive the screw-threaded end of a screw stud 53. This screw stud extends through a smooth hole in the piston head portion 41, said hole being counter-bored as at 55 to provide a shoulder 56. A spring 57 is interposed between the head 58 of the screw stud 53 and the shoulder 56, said spring urging the piston head portion 41 toward the piston head portion 40 so that the ends of the lugs of the respective piston heads engage with the opposite piston heads.

Substantially centrally of the inner end of each piston head there is provided a wearpiece 59. The lugs 42 and 43 form the side walls of a central opening or chamber 60 and the wearpieces 59 form the end walls thereof. This central opening receives the piston operating arm or lever 21 of the shock absorber, this lever being so arranged that, when pushed into the opening and engaging the wearpieces 59, the spring 57 around screw stud 53 is compressed, thereby increasing its tension. The ends of the respective lugs 42 and 43 are thus moved slightly away from their adjacent opposite piston head portions.

Each piston head portion has a longitudinal passage 70 provided with an increased diameter portion 71, thereby presenting a valve seat 72. A check valve 73 is normally urged into engagement with this valve seat by spring 74. These valves 73 are adapted to establish a fluid flow through the piston into the compression chambers to replenish any fluid losses within said chambers.

In the present invention applicant has presented a fluid displacement member or piston of a very sturdy structure, capable of being produced commercially at a minimum expense of time and labor.

While the form of embodiment of the present invention constitutes a preferred form, it is to be understood that other forms might be adopted, all coming within the scope of the present invention.

What is claimed is as follows:

1. A fluid displacement member comprising, in combination, two plugs; a lug on each plug engaging the opposite plug to hold said plugs in spaced relation; a pilot pin in aligned recesses of a plug and the engaging lug of the opposite plug; a screw extending through a smooth aperture in the last mentioned plug and threadedly engaging an interiorly threaded recess in the lug engaging said last mentioned plug; and a spring interposed between the screw and the plug through which said screw extends, yieldably urging the lugs against the opposite plugs.

2. A fluid displacement member comprising, in combination, two head portions; an off-center lug extending from each head portion substantially parallel to the axis of said head portion, the lug of one head portion engaging the opposite head portion to hold the two head portions in spaced relation; a pilot pin fitting into aligned recesses of a lug and the opposite head portion engaged thereby; a screw-stud extending slidably through a counter-bored aperture in the last mentioned head portion and threadedly engaging a recess in the lug of the other head portion; and a spring interposed between the screw-stud and the head portion through which it extends yieldably to maintain the head portions and lugs in proper engagement.

3. A fluid displacement member comprising, in combination, two head portions coaxially aligned and in spaced relation, the adjacent ends of said head portions each having a cut-away portion, the cut-away on the one head portion being on the opposite side of the axis of said head portions from the cut-away on the other head portion; a lug extending from each head portion and having its end seated in the cut-away of the opposite head portion, said lugs forming the side walls of a central chamber between the head portions; a wear resisting button in each head portion, said buttons forming the end walls of said central chamber; a pilot pin fitting into aligned recesses in one head portion and the engaging lug of the opposite head portion; a screw extending through a smooth counter-bored hole in the last mentioned head portion and threadedly engaging a recess in the lug engaging this head portion; and a coil spring around the screw, between the shoulder of the counter-bored hole through which said screw extends and the head of the screw, yieldably urging the head portions into engagement with the ends of lugs of the opposite head portion.

4. A double-headed piston comprising, in combination, two piston heads held in proper spaced relation by lugs, each forming an integral part of one piston head and engaging the other head, said lugs being on opposite sides of the axis of said heads; a pilot pin fitting in aligned recesses of a head and the lug of the opposite head; a headed screw extending through a counter-bored hole in said opposite head and threadedly engaging a recess in the lug of the other head; a coil spring in the counter-bored hole between the screw head and shoulder in the counter-bore, urging the heads toward each other; a through passage in each piston head; and a one-way check valve in each through passage.

In testimony whereof I hereto affix my signature.

WILLIAM A. CHRYST.